United States Patent [19]
Sauterel

[11] 3,775,859
[45] Dec. 4, 1973

[54] METHOD AND APPARATUS FOR MEASURING THE INCLINATION OF A RAILWAY TRACK

[75] Inventor: Gerard Sauterel, Pully, Switzerland

[73] Assignee: Matisa Material Industrial S.A., Grissier, Switzerland

[22] Filed: June 27, 1972

[21] Appl. No.: 266,711

Related U.S. Application Data

[63] Continuation of Ser. No. 5,279, Jan. 23, 1970, abandoned.

[30] Foreign Application Priority Data

July 24, 1969 Switzerland.................... 1040/69

[52] U.S. Cl................................. 33/338, 33/375
[51] Int. Cl............................................ B61k 9/08

[58] Field of Search.................... 33/338, 370, 371, 33/375

[56] References Cited
UNITED STATES PATENTS

| | | | |
|---|---|---|---|
| 309,792 | 12/1884 | McGregor | 33/338 |
| 2,784,496 | 3/1957 | Rousse | 33/338 |

*Primary Examiner*—William D. Martin, Jr.
*Attorney*—James M. Heilman

[57] ABSTRACT

This invention relates to a method of and apparatus for measuring the transverse inclination of a railway track during levelling and aligning of the track by means of an inclination measuring instrument which is sensitive to the accelerations and vibrations which are transferred to the track by the track adjusting tools.

4 Claims, 2 Drawing Figures

$D = D' + d$

METHOD AND APPARATUS FOR MEASURING THE INCLINATION OF A RAILWAY TRACK

This application is a continuation of application Ser. No. 5,279, filed Jan. 23, 1970, now abandoned.

This invention relates to a method of and apparatus for measuring the transverse inclination of a railway track during levelling and possibly aligning of the track.

With modern machines such adjustment of the track may be carried out automatically. The two lines of rails are levelled and aligned longitudinally according to the desired profile and direction, defined by a fictitious reference line in each of the corresponding planes.

The transverse levelling of the track, that is to say, the making of one line of rails level with the other, is carried out with the aid of measuring instruments such as a spirit level, simple pendulum or gyroscopic pendulum, which ensure the relative alignment of the two lines of rails with the prescribed inclination.

These measuring instruments are generally rigid with a transverse sensing base of the two lines of rails, which is located in the area of action of the tools of the track adjusting machine, which by their action, transmit via the rails, transverse and vertical vibrations and accelerations to the sensing base. However, the instruments, which must have a very short response time, are very sensitive to such phenomena which introduce errors and inaccuracies into the information obtained. Attempts have been made to make the measuring instruments insensitive to said accelerations however, it is known in the art that all the systems which are used to make these instruments insensitive to the accelerations are very expensive and that the cost thereof increases with the precision requirements. In addition, these systems are diminishing the reactions of the insturment, which is a further disadvantage because, as said hereinbefore, the instrument must have a very short response time.

The problem is thus to measure the transverse inclination, with respect to the horizontal reference, of a railway track region which is so disturbed during the adjustment thereof by the accelerations and vibrations due to the operation of the adjusting tools, that it is practically impossible to rely on the indications of the measuring instruments which are usually used for measuring the inclination of such regions. As, in fact, there exists presently no other type of instrument for measuring such an inclination than those which make use of the gravity, it is thus compulsory to make use of that kind of instrument, despite the risk of imprecision they involve.

It is therefore an object of this invention to overcome these disadvantages. According to the invention there is provided a method for measuring the transverse inclination, with respect to the horizontal reference, of a railway track region which is disturbed by the accelerations and vibrations which are transferred thereto by the track adjusting tools of a machine adjusting said disturbed track region, said measure being effected by means of an inclination measuring instrument which is sensitive to said accelerations and vibrations, such method comprising the steps of measuring with said inclination measuring instrument the transverse inclination, with respect to the horizontal reference, of a stable railway track region which is far enough from said disturbed track region to be substantially unaffected by the action of said adjustment tools, measuring the transverse inclination variation of the track between said disturbed track region and said stable track region by the detection of the obliquity relation between said two track regions, and summing said measure of the transverse inclination variation between said two track regions to the measure of the transverse inclination, with respect to the horizontal reference, of said stable track region.

Thus if D represents the inclination of the disturbed track region to be measured for being corrected, $D'$ the measured inclination of the stable track region and $d$ the measured transverse inclination variation of the track between said disturbed track region and said stable track region, then, according to the above method, $$D = D' + d$$

The invention also comprises apparatus for carrying out the method set forth above, that is to say apparatus for measuring the transverse inclination, with respect to the horizontal reference, of a railway track region which is disturbed by the accelerations and vibrations which are transferred thereto by the track adjusting tools of a machine adjusting said disturbed track region.

In order that the invention may be more readily understood, the method and one embodiment of the apparatus will now be described in detail by way of example with reference to the accompanying drawings in which.

In each of the two figures the two lines of rails of a section of curved track are shown by two curved lines 1 and 1a.

Figure 1:
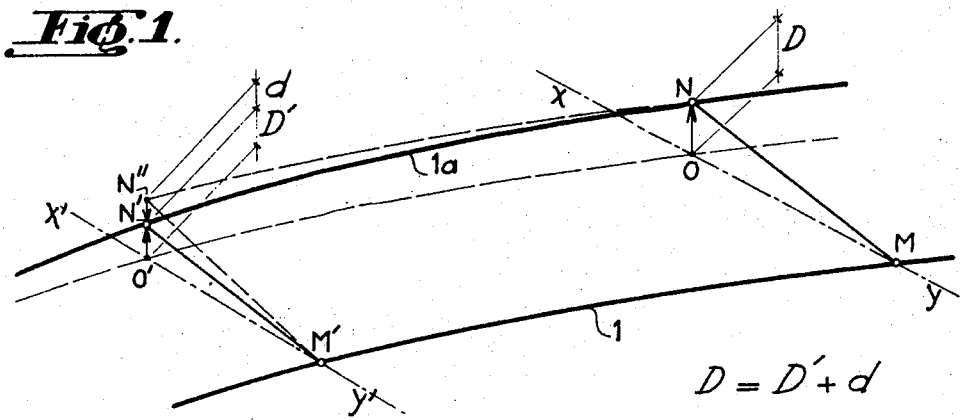
FIG. 1 is a schematic representation of a railway track and illustrating the principles of the method according to the invention.

Referring firstly to FIG. 1, a section MN to the right is substantially perpendicular to the two lines of rails 1 and 1a, the horizontal line xy being located in the same vertical plane and passing through M. This shows a difference in level ON or transverse inclination D, with respect to the horizontal reference, of the line of rails 1a relative to the line of rails 1 in this region of the track.

To the left of this same FIG. 1 in another region of this track a second section M'N' in the same way shows a difference in level O'N' or transverse inclination $D'$ with respect to the horizontal reference, of the same line of rails 1a relative to the line of rails 1 in said other region of the track.

A point N'' has been entered on O'N' so that $$O'N'' = ON = D$$

At this level there is always $$\overline{O'N''} = \overline{O'N'} + \overline{N'N''}$$

Expressed differently: $D = D' + \overline{N'N''}$

However, $N'N''$ is actually the difference of inclinations $D$ and $D'$ i.e. this difference $N'N'' = d$ There will always be $D = D' + d$ In other words, the measurement of the transverse inclination of a railway track region such as that defined by the section MN can always be effected in another region, such as that defined here by another section M'N', by the algebraic sum $O'N' + N'N''$ or the sum of the inclination $D'$ of the region M'N' and the difference of inclinations $d$ between the regions MN and M'N'. It will thus be possible to measure the inclination of a particular region of the track when such a region of the track is affected by the accelerations and vibrations which are transferred thereto by the adjusting tools of a machine rectifying said region of the track, such a measurement being made through another region of the track which is far enough from said disturbed region to be substantially unaffected by the action of said adjustment tools and of which the inclination with respect to the horizontal reference can be measured by means of an inclination measuring instrument which is sensitive to the accelerations and vibrations.

It is to be noted that only the inclination $D'$ of the stable track region is being measured with respect to the horizontal reference and by means of the instrument sensitive to the accelerations and vibrations, because said stable track region can be selected far enough at an appropriate distance from the disturbed region for being stable enough to allow the use of a sensitive transverse inclination measuring instrument which will be thus away from the effect of the accelerations due to the action of the adjusting tools. It should also be noted that the difference of inclinations $d$ between the two track regions can of course not be obtained by a comparison of the inclinations of the two regions measured with respect to the horizontal reference. Such a comparison would in fact not be possible because to make it, it would be necessary to have the possibility of measuring the transverse inclination with respect to the horizontal reference in both regions, and thus in the disturbed region where it is precisely impossible to make use of the sensitive measuring instrument. Therefore, the measure of the difference of inclinations $d$ is to be made by measuring the inclination of one of the track regions with respect to the other which is taken as a reference, without taking into account the values $D$ and $D'$ of the transverse inclination of each of them with respect to the horizontal reference. In fact, this measure of the difference of inclinations is the value named in the art "warping" of the track between the considered regions and this is the obliquity relation between the two regions.

Figure 2:
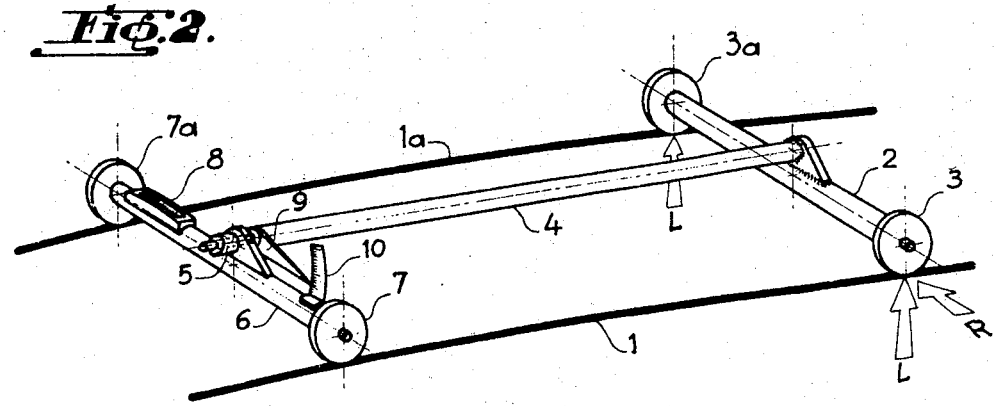
FIG. 2 is a diagrammatic perspective view of one embodiment of apparatus according to the invention.

This principle will now be shown applied, as in FIG. 2.

There is shown an apparatus for measuring the transverse inclination of a railway track, comprising two sensing bases 2 and 6 supported on the two lines of rails 1 and 1a by support members in the form of sensing rollers 3 and 3a, 7 and 7a.

The base 2, or main base, is supported on the disturbed track region, i.e. shifted and raised by the tools (not shown) of a track adjusting machine according to arrows R and L which represent the transverse and rotational accelerations to which the track is subjected. The base 6, or auxiliary base, rests far enough at an appropriate distance away from the main base 2, said distance being such that the track is stable in that region and substantially unaffected by the action of the tools. These two bases are connected by a rigid shaft 4 of which one end is rigidly connected to the main base 2 while its other end is articulatedly supported transversely on and pivots in a bearing 5 of auxiliary base 6. This shaft 4 integral with base 2 faithfully follows each inclination movement of the base 2.

A measuring instrument 8, whish in this case is a spirit level which can be read directly be could for example be replaced by an electronic level indicator in the case of automatic levelling control, is here rigid with the stable auxiliary base 6 and measures the transverse inclination $D'$ defined by auxiliary base 6. Due to its location on auxiliary base 6 in the stable track region, the measuring instrument 8 is withdrawn out of the disturbed track region and it is taken away from the effect of the transverse accelerations R as well as from the effects of the rotational accelerations L which are present in the disturbed track region and to which base 2 is subjected. It can thus give a measure of the transverse inclination $D'$ with respect to the horizontal reference, of the stable track region with a maximum precision.

In addition to the gradient indicator 8, there is provided an instrument connected to both bases for measuring the difference between the inclinations of the two bases, comprising for instance a pointer 9 rigidly fixed at the end of the shaft 4 and which moves in front of a dial 10 which is rigid with base 6 and graduated in such a way that the pointer indicates zeor when the two sensing bases 2 and 6 are in the same plane or are parallel. In this way and making use of FIG. 1, it is easy to understand that any difference $d$ of inclination between the two bases 2 and 6 (MN and M'N' on FIG. 1) appears as a proportional displacement in the same direction of the pointer 9 on the graduated dial 10. The instrument 9-10 indicates thus the inclination of one of the bases with respect to the other without taking into account the values $D$ and $D'$ of the transverse inclinations with respect to the horizontal reference of each of them. The instrument 9-10 gives thus the difference in inclination by the detection of the warping value or obliquity relation between the two regions sensed by bases 2 and 6. It is to be noted that the instrument 9-10 is an instrument which is insensitive to the accelerations L nd R which have therefore no influence on the quality of the warping or obliquity relation $d$.

It will thus be possible to add algebraically the two values $D'$ and $d$ to obtain the desired measurement of transverse inclination $D$ according to the basic formula $D = D' + d$.

It is obvious that the performance of these measurements can be made automatic by using, for example an electronic level indicator in place of the spirit level and an inductive transducer in place of the pointer and dial, electronic instruments which in conjunction and by known means permit automatic control of the levelling.

What is claimed is:

1. A method for measuring the transverse inclination, with respect to a horizontal reference, of a railway track portion which is disturbed by the accelerations and vibrations of track adjusting tools, said method comprising: measuring the inclination of a stable portion of the track, displaced from the disturbed portion, by a gravity operated measuring instrument, said measuring instrument substantially unaffected by the vibrations of track adjusting tools; measuring the difference in inclination between the stable portion of the track and the disturbed portion of the track, said difference measurement being determined by a rigid shaft coupled between the two portions of the track; and indicating the results of said measurements so that a summation can be made and the inclination of the disturbed portion of the track determined thereby.

2. A method for measuring the transverse inclination, with respect to a horizontal reference, of a railway track portion which is disturbed by the accelerations and vibrations of track adjusting tools, said method comprising: measuring the transverse inclination of a stable portion of the track, displaced from the disturbed portion, by an inclination measuring instrument which is sensitive to said vibrations and accelerations, said measuring instrument substantially unaffected by the accelerations and vibrations of the track adjusting tools due to the displacement thereof; measuring the difference in inclination between the disturbed portion of the track and the stable portion of the track, said difference in inclination being obtained by the detection of the warpage between said two track portions; and summing the results of said measurements.

3. An apparatus for measuring the transverse inclination, with respect to a horizontal reference, of a railway track portion which is disturbed by the accelerations and vibrations whch are transferred thereto by track adjusting tools, comprising:
   a. a main sensing base having two support members engaging opposite rails and displsed in a plane transverse to the rails, said main base secured to a rigid shaft and located in an area where the vibrations of the track adjusting tools disturb the support members;
   b. an auxiliary sensing base located at a distance from the main base, said auxiliary base also having two support members engaging opposite rails, and disposed in a plane transverse to the rails, said auxiliary base including a gravity inclination measuring instrument sensitive to vibration, and an indicator having one portion secured to said rigid shaft and another portion secured to the auxiliary sensing base for indicating the relative inclination of said bases;
   c. said gravity measuring instrument and said indicator for showing the results of the two measurements so that a summation of the results provides a value proportional to the inclination of the main base.

4. An apparatus for measuring the transverse inclination, with respect to a horizontal reference, of a railway track portion which is disturbed by the accelerations and vibrations which are transferred thereto by track adjusting tools, comprising:
   a. a main sensing base and an auxiliary sensing base, said main base located at a point where track adjusting tools are operating to align the track in accordance with a desired program;
   b. said auxiliary base located at a distance from said main base where there are substantially no vibrations due to the adjusting tools;
   c. said main base having two support members engaging opposite rails and disposed in a plane transverse to the rails, said main base including a rigid shaft secured to the base and extending to the auxiliary base being terminated by a first indicating means; and
   d. said auxiliary base also having two support members engaging opposite rails and disposed in a plane transverse to the rails and supporting a gravity inclination measuring instrument, sensitive to vibration, said auxiliary base also supporting a bearing for rotatably mounting the rigid shaft, and supporting a second indicating means adjacent to the first indicating means for indicating the relative inclination of the two bases.

* * * * *

UNITED STATES PATENT OFFICE
CERTIFICATE OF CORRECTION

Patent No. 3,775,859　　　　Dated December 4, 1973

Inventor(s) GERARD SAUTEREL

It is certified that error appears in the above-identified patent and that said Letters Patent are hereby corrected as shown below:

In the cover sheet, column 1, line 13, change the priority date from "July 24, 1969" to -- January 24, 1969 --

Signed and sealed this 14th day of May 1974.

(SEAL)
Attest:

EDWARD M. FLETCHER, JR.
Attesting Officer

C. MARSHALL DANN
Commissioner of Patents